April 11, 1961  R. K. GREAVES  2,979,098
SADDLE BAG FOR AUTOMOBILES
Filed Sept. 4, 1958  3 Sheets-Sheet 1
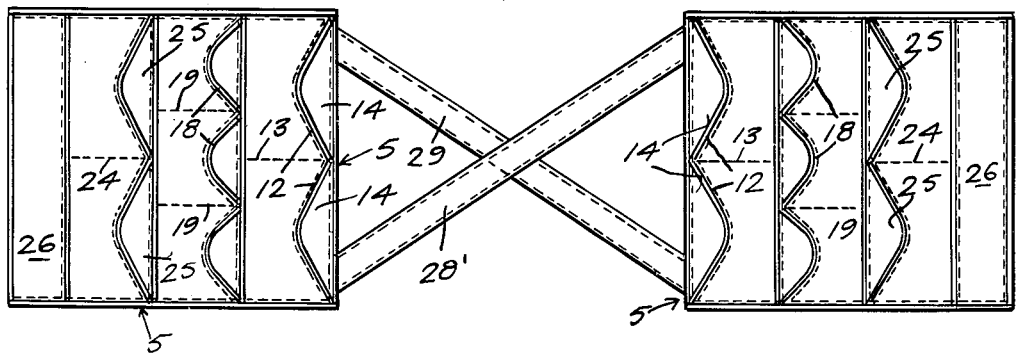
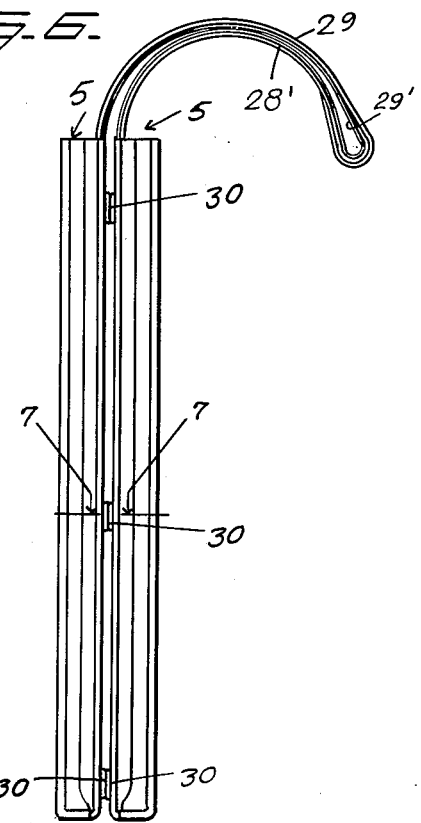
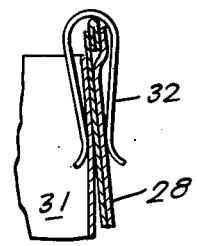
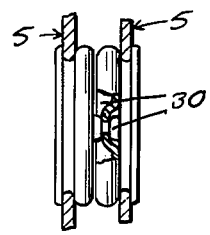
Ruth K. Greaves
INVENTOR
BY
ATTORNEYS.

April 11, 1961  R. K. GREAVES  2,979,098
SADDLE BAG FOR AUTOMOBILES
Filed Sept. 4, 1958  3 Sheets-Sheet 2
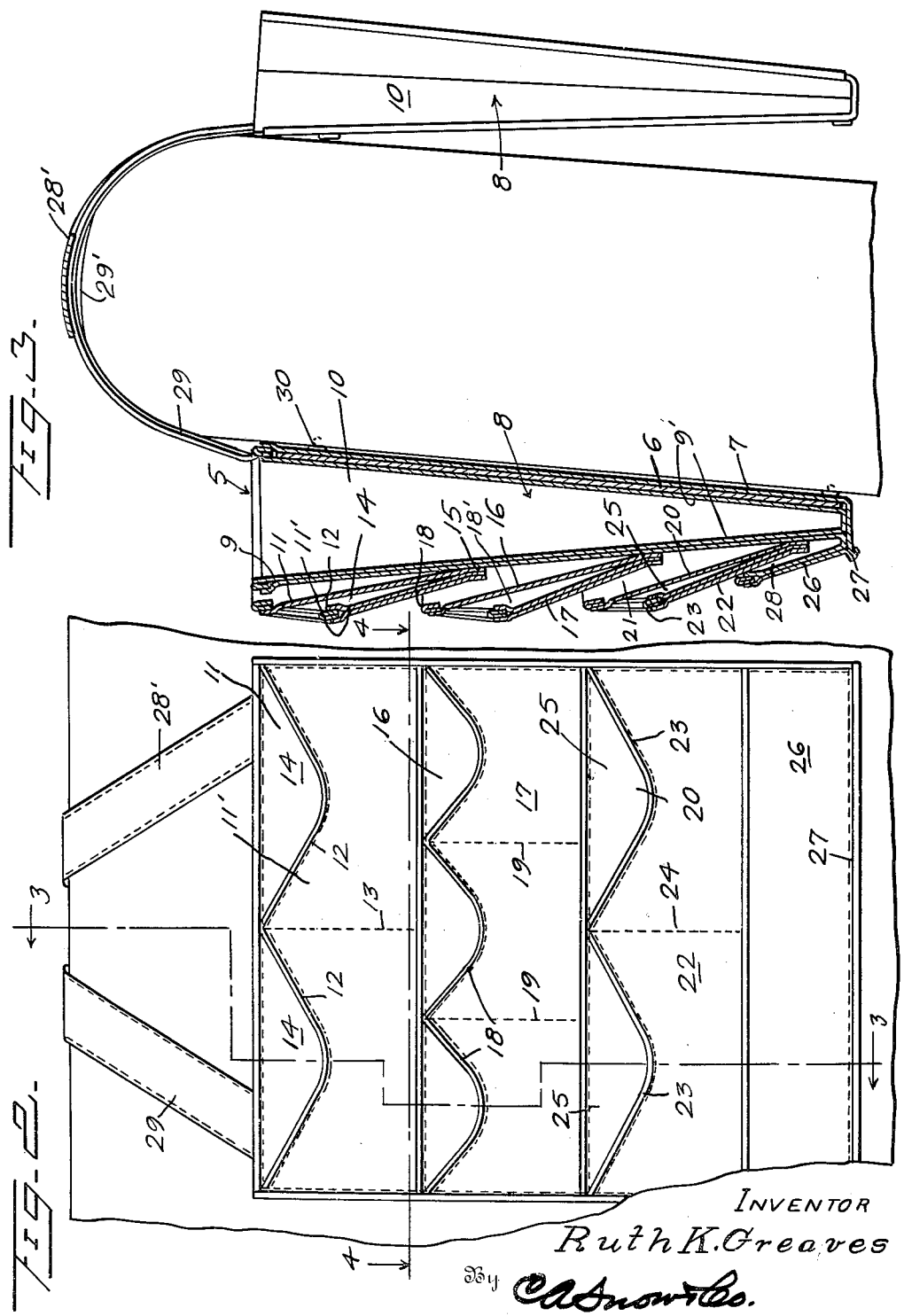
INVENTOR
Ruth K. Greaves
By C.A.Snow&Co.
Attorneys.

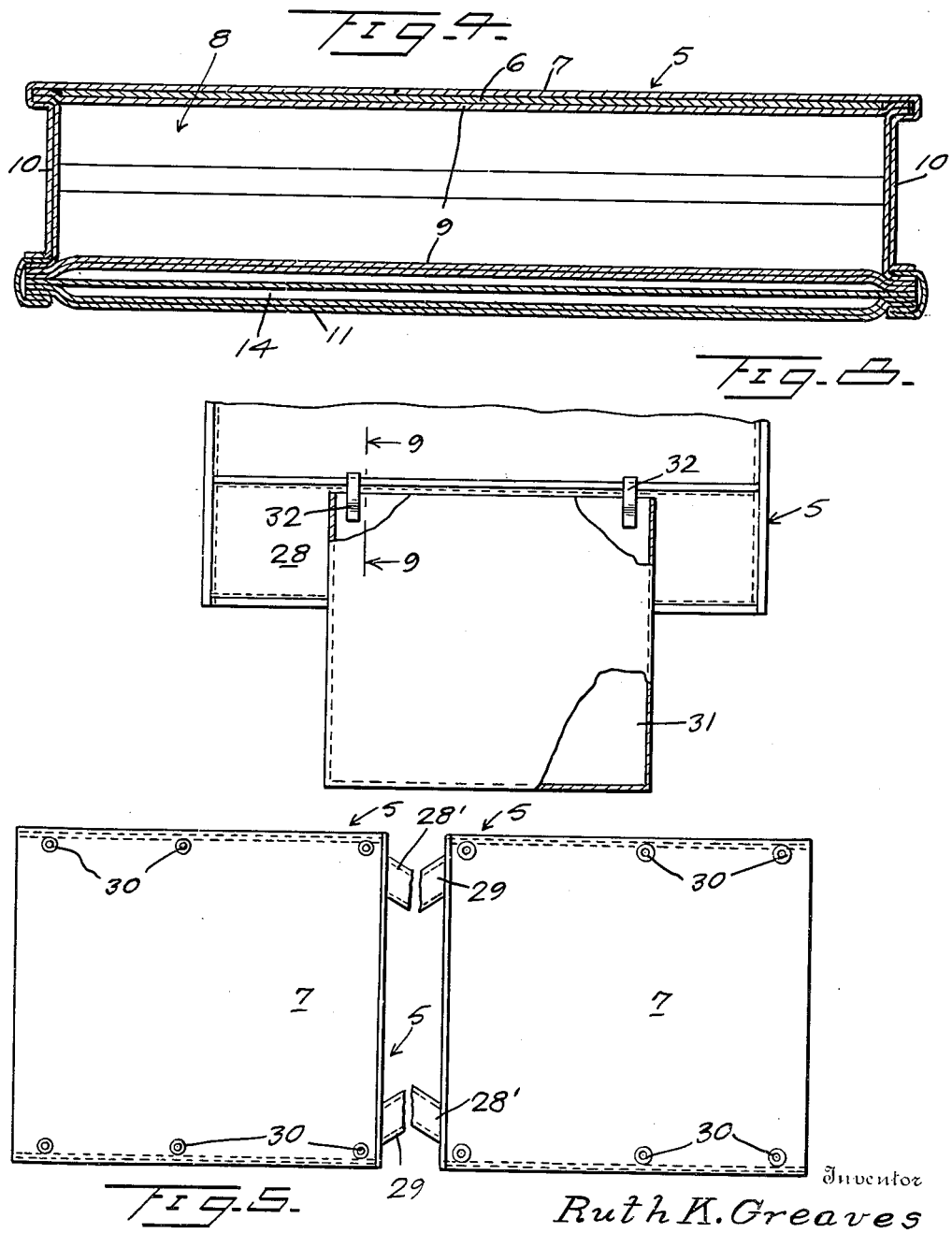

United States Patent Office 2,979,098
Patented Apr. 11, 1961

2,979,098

SADDLE BAG FOR AUTOMOBILES

Ruth K. Greaves, 2458B Adina Drive N.E., Atlanta, Ga.

Filed Sept. 4, 1958, Ser. No. 758,958

1 Claim. (Cl. 150—1)

This invention relates to a carrier construction and particularly to carriers commonly known as the saddle bag type.

An important object of the invention is to provide a carrier of this character embodying a pair of identical carrier sections constructed of semi-rigid material having exposed pockets in the front surfaces thereof, the rear surfaces of the sections being flat so that the flat sides of the sections may be fitted together and secured in such position, providing a convenient practical hand bag or carrier.

A further object of the invention is to provide supporting straps connected between the sections and secured to the upper edges of said sections, the supporting straps being so constructed and arranged that they may be positioned over the back of the front seat of a motor vehicle, in such a way that one section will rest in a position convenient for use in supporting articles readily accessible to the occupants of the front seat, while the other section of the carrier is supported in a position wherein the pockets thereof will be accessible for supporting articles for the convenience of the occupants of the rear seat of the vehicle.

Still another object of the invention is to provide a carrier wherein the pockets thereof are constructed in such a way that the articles contained therein will be securely held against accidental displacement, in the event that the motor vehicle in which the carrier is used should stop suddenly.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 1 is a plan view of a carrier constructed in accordance with the invention, as extended to a position where it may be hung over the back of the front seat of a motor vehicle.

Fig. 2 is an elevational view illustrating one section of the carrier as hanging over the seat of a vehicle, exposing the pockets of one section.

Fig. 3 is a sectional view taken on line 3—3 of Fig. 2, the pockets of one section being omitted in this view, illustrating the location of the sections when the carrier is hung over the back seat of a vehicle.

Fig. 4 is a sectional view taken on line 4—4 of Fig. 2.

Fig. 5 is a view illustrating the carrier as extended with the flat sides of the sections exposed.

Fig. 6 is an edge elevational view of the carrier with the flat surfaces of the sections as moved together adapting the carrier for use as a hand bag.

Fig. 7 is a sectional view taken on line 7—7 of Fig. 6.

Fig. 8 is a fragmental elevational view illustrating a disposable container as hung over the edge of one of the pockets of the carrier.

Fig. 9 is a sectional view taken on line 9—9 of Fig. 8.

Referring to the drawings in detail, the carrier comprises a pair of identical sections indicated generally by the reference character 5, and since the sections are identical, only one of the sections will be described in detail.

Each section comprises a rear wall 6 constructed of semi-rigid material, the outer surface thereof being covered by the flexible material 7, the covering being of any desired flexible material, such as leather, plastic material, or the like, to lend a pleasing appearance to the carrier.

The covering 7 is of a length so that the side edges of the covering will lie flush with the side edge of the rear wall 6, as better shown by Fig. 2 of the drawings.

A front wall 9 is spaced from the rear wall to define a pocket 8 and a liner 9' attached to the front wall has an extension which covers the front face of the rear wall.

The side edges of the covering 7, are connected with the side members 10, which side members taper towards the lower edges thereof as shown by Fig. 3 of the drawings, provided pockets which may expand to increase the capacity of the pockets 8.

The reference character 11 indicates a transversely disposed strip of flexible material corresponding to the flexible covering material 7, which has its side edges and lower edge secured to the front wall of the carrier section. A strip of flexible material 11' is secured to the strip 11, and has its upper or free edge scalloped as at 12 providing an easily accessible pocket with an open upper end, there being provided a line of stitching 13 securing the strip 11 to the front section, at a point intermediate the ends of the strip 11 providing two outer pockets 14. The lower edge of the strip 11 is secured to the front wall of the carrier section, by a line of stitching 15 closing the bottoms of the pockets 14.

A second transversely disposed strip 16 is provided which is displaced vertically relative to the first strip and is also constructed of material of which the section is covered, the side edges of the strip of material 16 being secured at the edges of the front wall of the front section.

A layer of flexible material indicated at 17 is of a length equal to the length of the transversely disposed strip 16, and is secured to strip 16, along its side and bottom edges and as shown, is provided with a scalloped upper edge 18, providing an outer pocket 18' with the strip 16.

Between the scallops of the edge indicated at 18, are vertical lines of stitching 19 dividing the space between the transversely disposed flexible strip of material 17 and strip 16 into three pockets of equal dimensions.

A third flexible strip 20 has its side and lower edges secured to the front wall of the section, and provides a pocket 21 throughout the entire width of the front wall of the section.

Secured along its side and lower edges to the outer surface of the flexible strip 20, is a strip of flexible material 22, which has its upper edge constructed to provide scallops 23 providing openings of an easy accessible character to permit material to be readily positioned between the strip of flexible material 22 and the third flexible strip 20.

A vertical line of stitching 24 is disposed intermediate the side edges of the flexible strip 20 and flexible material 22, dividing the space between the flexible strip 20 and strip of flexible material 22 into a pair of spaced substantially large lateral pockets 25. Secured along the lower edge of the front wall of the carrier section is a strip of flexible material 26 which has its side edges secured to the side edges of the front wall of the front section of the carrier, the lower edge of the flexible strip being secured along the bottom of the front wall as at 27, the upper edge of the flexible strip being free to extend outwardly and provide an expansible pocket 28.

It will of course be understood that the lower edges of the strips of flexible material which extend transversely of the outer surface of the front wall of the carrier, are secured within the upper edge of the adjacent lower compartment or strip of material, closing the bottoms of the various compartments. It is obvious from the drawings that the upper or top edges of the strips that form the outer surface of the front walls of the pockets of this saddle bag for automobiles, each has the contour of a catenary when viewed from the front of each section.

Secured to the upper edges of the rear walls of the sections of the carrier, are straps 28' and 29, the straps having their ends secured adjacent to the side edges of the sections, the intermediate portions of the straps crossing each other as better shown by Fig. 1 of the drawings, the straps 28' and 29 being connected by lines of stitching at their points of crossing so that the straps will be prevented from separating under the weight of material held within the carrier.

The construction of the sections 5 is such that when the rear walls of the sections are brought together in a manner as shown by Fig. 6 of the drawings, the head and socket fasteners 30 will be connected, holding the sections together, and providing a hand bag. In this use of the carrier, the straps 28' and 29 provide a handle by means of which the hand bag may be conveniently carried.

As better shown by Fig. 8 of the drawings, a disposable container indicated by the reference character 31 may be secured to the lowermost pocket wall 28 by means of clips 32 which fit over the rear edge of the disposable container 31 and upper edge of the lower pocket 28.

In order that the straps 28' and 29, will be held in place against slipping when positioned over the back seat of a motor vehicle, the under surfaces of said straps are provided with friction backing strips of elastic material, indicated at 29'.

From the foregoing it will be seen that when the device is used as a carrier to be positioned over the back of the front seat of a motor vehicle, the front side walls of the sections will be disposed outwardly and the plurality of pockets forming a part of the front walls of the sections may be conveniently used for containing articles necessary for convenience in traveling in a motor vehicle, such as a road maps, pencils, note pads, cleaning tissue, and such sundry articles.

What I claim is:

A saddle bag comprising a pair of identical sections constructed in part of semi-rigid material, each section embodying a semi-rigid flat rear wall and a front wall spaced forwardly of said rear wall, said front wall having an extension on its bottom folded upwardly and overlying said rear wall and being joined thereto to cover said rear wall, side wall members tapered towards the lower edge thereof and stitched to the sides of the front and rear walls providing an expansible main pocket, transversely disposed vertically displaced and partially overlapping strips of flexible material, lines of stitching secured along the side and bottom edges of said vertically displaced strips, securing said vertically displaced strips to said front wall providing a plurality of pockets between said strips and the front wall, additional transversely disposed strips of flexible material having scalloped upper edges, secured by lines of stitching along the side and bottom edges thereof to said vertically displaced strips providing additional pockets with said vertically displaced strips, vertical lines of stitching dividing said latter pockets into smaller pockets, and substantially long straps having their ends secured to said pair of identical sections, connecting said sections, and said straps being crossed intermediate their ends and secured together at their points of crossing.

References Cited in the file of this patent
UNITED STATES PATENTS

| | | |
|---|---|---|
| 1,839,862 | Bartlett | Jan. 5, 1932 |
| 2,018,809 | Rogers | Oct. 29, 1935 |
| 2,359,372 | Leader | Oct. 3, 1944 |
| 2,405,517 | Plummer | Aug. 6, 1946 |
| 2,493,182 | Beder | Jan. 3, 1950 |
| 2,507,842 | Waddill | May 16, 1950 |
| 2,620,005 | Hall | Dec. 2, 1952 |